US009063959B2

(12) United States Patent
Holmes et al.

(10) Patent No.: US 9,063,959 B2
(45) Date of Patent: Jun. 23, 2015

(54) DECOMPOSING XML SCHEMA DOCUMENTS INTO SUBSETS

(71) Applicant: International Business Machines Corporation, Armonk, NY (US)

(72) Inventors: John C. Holmes, Stratham, NH (US); Ming Jiang, Cary, NC (US); Jeff J. Li, Boca Raton, FL (US); Yong Li, Newton, MA (US); David S. Sotkowitz, Sharon, MA (US)

(73) Assignee: International Business Machines Corporation, Armonk, NY (US)

( * ) Notice: Subject to any disclaimer, the term of this patent is extended or adjusted under 35 U.S.C. 154(b) by 118 days.

(21) Appl. No.: 13/749,136

(22) Filed: Jan. 24, 2013

(65) Prior Publication Data

US 2014/0207828 A1 Jul. 24, 2014

(51) Int. Cl.
*G06F 17/30* (2006.01)

(52) U.S. Cl.
CPC .... *G06F 17/30289* (2013.01); *G06F 17/30292* (2013.01)

(58) Field of Classification Search
None
See application file for complete search history.

(56) References Cited

U.S. PATENT DOCUMENTS

| | | | |
|---|---|---|---|
| 7,246,136 B2 | 7/2007 | Cameron et al. | |
| 8,015,483 B2 | 9/2011 | Vishwanath et al. | |
| 8,051,373 B2 | 11/2011 | Rothschiller et al. | |
| 8,112,738 B2 | 2/2012 | Pohl et al. | |
| 2004/0025117 A1* | 2/2004 | Ingersoll et al. | 715/523 |
| 2005/0160164 A1 | 7/2005 | Benfield et al. | |
| 2007/0050707 A1 | 3/2007 | Liu et al. | |
| 2007/0162470 A1* | 7/2007 | Chang et al. | 707/100 |
| 2008/0133553 A1 | 6/2008 | Kitsis et al. | |
| 2010/0235725 A1 | 9/2010 | Drayton et al. | |
| 2011/0184990 A1 | 7/2011 | Murphy et al. | |
| 2011/0320497 A1 | 12/2011 | Takase | |
| 2014/0207830 A1 | 7/2014 | Holmes et al. | |

OTHER PUBLICATIONS

Erhard Rahm et al., "Matching Large XML Schemas," SIGMOD Record, vol. 33. No. 4, Dec. 2004, pp. 26-31.

Dong-Yal Seo et al., "Discovery of Schema Information from a Forest of Selectively Labeled Ordered Trees," In Proc. of Workshop on Management of Semistructured Data (in Conjunction with PODS/SIGMOD), 1997, 6 pages.

* cited by examiner

*Primary Examiner* — Son T Hoang
(74) *Attorney, Agent, or Firm* — Susan Murray; Edell, Shapiro & Finnan, LLC

(57) ABSTRACT

According to one embodiment of the present invention, a system decomposes a set of schema files. The system receives a set of schema files and automatically identifies a plurality of root schema files in the set, where a root schema file is determined based on remaining schema files in the set lacking a reference to that schema file. For each root schema file, the system creates a subset of the original set of schema files. The subset contains the root schema file, and at least one subset further includes one or more schema files that provide information for that root schema file. Embodiments of the present invention further include a method and computer program product for decomposing a set of schema files in substantially the same manners described above.

14 Claims, 8 Drawing Sheets

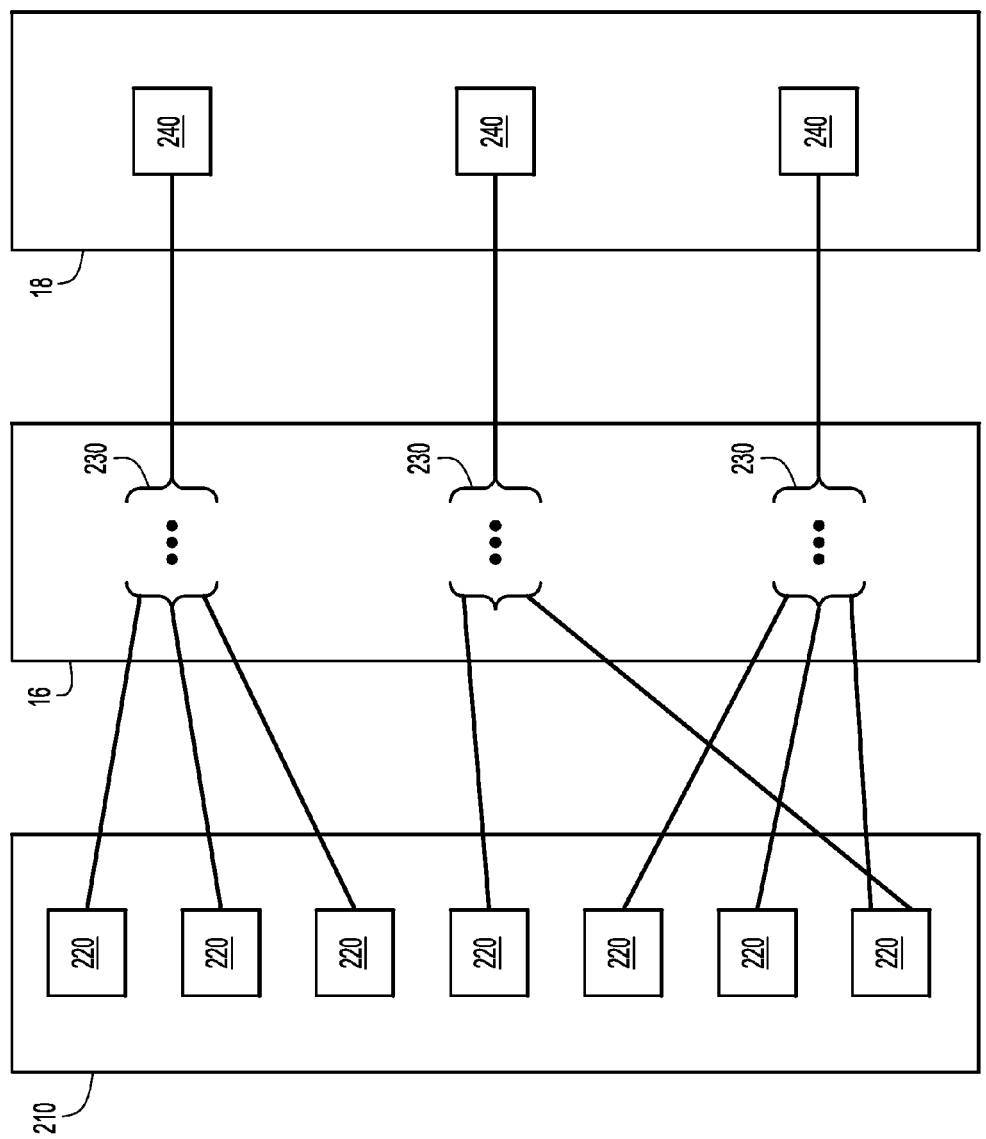

Items.zip

ItemA.xsd         210

ItemB.xsd

Simple/ identity.xsd

Complex/ identity.xsd

FIG.3A

ItemA.xsd
```xml
<?xml version="1.0" encoding="UTF-8"?>
<xs:schema xmlns:xs="http://www.w3.org/2001/XMLSchema">
    <xs:include schemaLocation="simple/identity.xsd"/>
  <xs:element name="Item_A">
    <xs:complexType>
      <xs:sequence>
        <xs:element ref="identity"/>
      </xs:sequence>
    </xs:complexType>
  </xs:element>
</xs:schema>
```

ItemB.xsd
```xml
<?xml version="1.0" encoding="UTF-8"?>
<xs:schema xmlns:xs="http://www.w3.org/2001/XMLSchema">
    <xs:include schemaLocation="Complex/identity.xsd"/>
  <xs:element name="Item_B">
    <xs:complexType>
      <xs:sequence>
        <xs:element ref="identity"/>
      </xs:sequence>
    </xs:complexType>
  </xs:element>
</xs:schema>
```

FIG.3B

Simple/identity.xsd

```xml
<?xml version="1.0" encoding="UTF-8"?>
<xs:schema xmlns:xs="http://www.w3.org/2001/XMLSchema">
  <xs:element name="identity">
    <xs:complexType>
      <xs:sequence>
        <xs:element name="name" type="xs:string"/>
      </xs:sequence>
    </xs:complexType>
  </xs:element>
</xs:schema>
```

Complex/identity.xsd

```xml
<?xml version="1.0" encoding="UTF-8"?>
<xs:schema xmlns:xs="http://www.w3.org/2001/XMLSchema">
  <xs:element name="identity">
    <xs:complexType>
      <xs:sequence>
        <xs:element name="firstName" type="xs:string"/>
        <xs:element name="middleInitial" type="xs:string"/>
        <xs:element name="lastName" type="xs:string"/>
      </xs:sequence>
    </xs:complexType>
  </xs:element>
</xs:schema>
```

FIG.3B CONTINUED

DECOMPOSING XML SCHEMA DOCUMENTS INTO SUBSETS

BACKGROUND

1. Technical Field

Present invention embodiments relate to Extensible Markup Language (XML) schema files, and more specifically, to decomposing a set of XML schema files into subsets. Each subset contains a root schema file and zero or more additional schema files that provide information for that root schema file, directly or indirectly.

2. Discussion of the Related Art

XML schemas are widely used to define standard document types for storing and exchanging information. An XML schema specifies types of XML documents (e.g., by constraining the content and attributes of allowed elements). Several languages exist for expressing XML schemas, including Data Type Definitions (DTD) and XML Schema Definitions (XSD).

Industry standards are often distributed as a number of XML schemas packaged in a single zip file. Some of these standards contain hundreds of XSD and Web Services Description Language (WSDL) schema files. When a user wants to import those schema files into an application and create XML parsing or composing jobs based on the imported schemas, the user has to discover the interrelationships among the schema files first. Importing the entire zip file often results in a type conflict or in an invalid schema type due to a type being overwritten. This outcome is common to many of the industry standard schemas (e.g., ACORD, IRS Tax schema, etc.).

The current practice of discovering the relationships among schema files is to use editor tools to find the XML elements "include", "import", and "redefine" in the schema files and then determine the relationships between the schema files manually. This approach is practicable when the XML files are simple and few. However, industry standards can be complex and can contain many XML schema files. Furthermore, a number of industry standards reuse a qualified name for different elements representing different structures. Duplicate names in different XSD can lead to invalid and unusable schema libraries that cannot be used for XML job designs.

BRIEF SUMMARY

According to one embodiment of the present invention, a system decomposes a set of schema files. The system receives a set of schema files and automatically identifies a plurality of root schema files in the set, where a root schema file is determined based on remaining schema files in the set lacking a reference to that schema file. For each root schema file, the system creates a subset of the original set of schema files. The subset contains the root schema file, and at least one subset further includes one or more schema files that provide information for that root schema file. Embodiments of the present invention further include a method and computer program product for decomposing a set of schema files in substantially the same manners described above.

BRIEF DESCRIPTION OF THE SEVERAL VIEWS OF THE DRAWINGS

Generally, like reference numerals in the various figures designate like components.

FIG. 2 is a data flow diagram of decomposition of a set of XML schema files into subsets according to an embodiment of the present invention.

FIGS. 3A-3B illustrate an example set of XML schema files contained in a zip file.

DETAILED DESCRIPTION

Present invention embodiments pertain to decomposing multiple XML schema files into subsets corresponding to root schema files. Each subset contains a root schema file and zero or more additional schema files that provide information for that root schema file, directly or indirectly. For example, an embodiment of the present invention enables a user to import a zip file containing an industry standard defined by multiple XML files. The zip file is broken down into multiple subsets corresponding to top-level schema files, where a top-level schema file (also called a root schema file) is neither included nor imported by any of the schema files. Subsets of schema files may share any of the schema files other than the root schema files. A library is created for each subset. The libraries can be used with an application program to design XML parsing and composing jobs.

One aspect of an embodiment of the present invention is to minimize the user's manual work in discovering the interrelationships among schema files in an industry standard. Another aspect is to separate the schema files into meaningful sets. Still another aspect is to import them into separate libraries. A further aspect is to avoid showing multiple XML elements with the same name to users at the same time.

Figure 1:
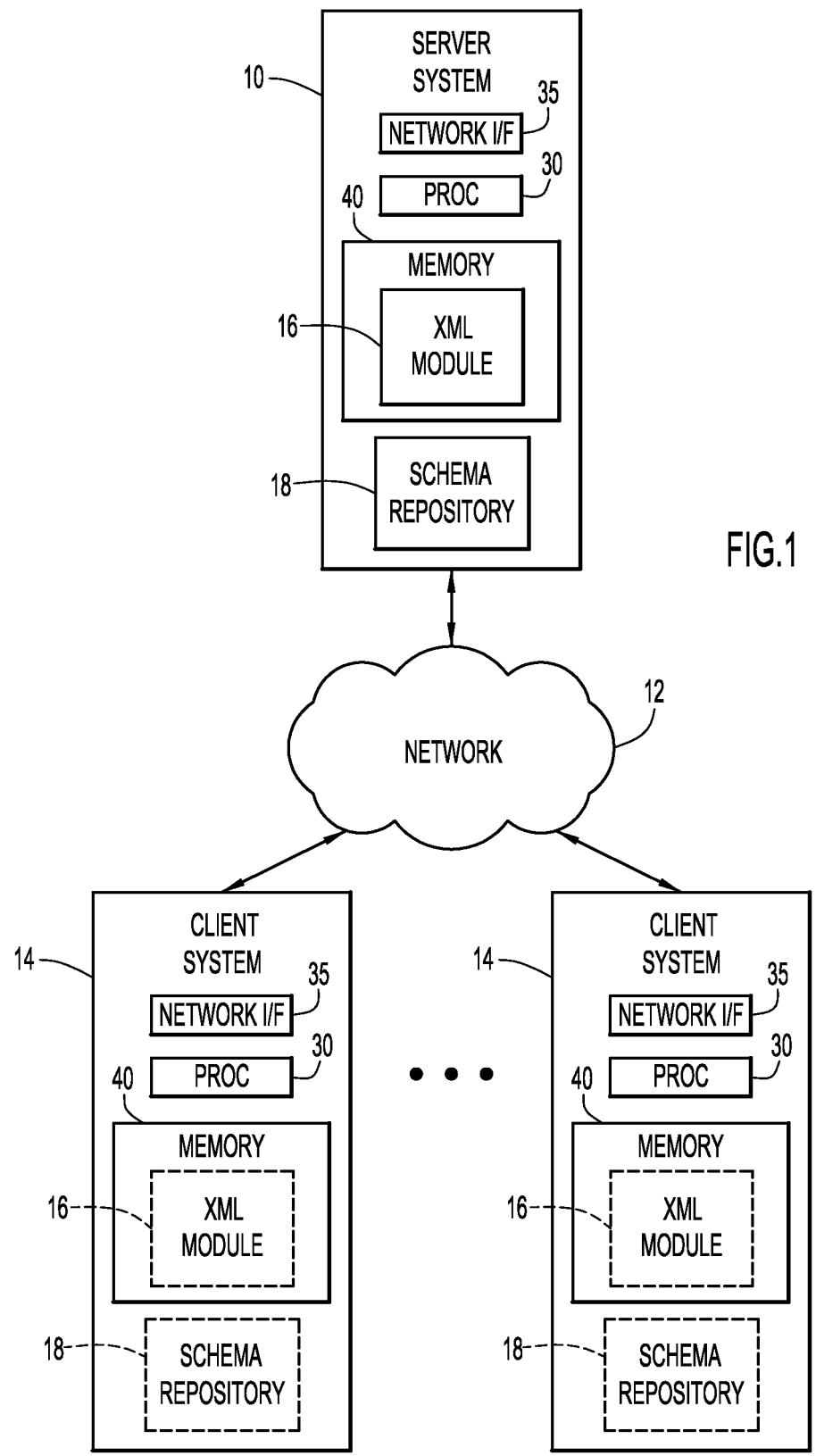
FIG. 1 is a diagrammatic illustration of a computing environment for an embodiment of the present invention.

An example computing environment for use with a present invention embodiment is illustrated in FIG. 1. Specifically, the environment includes one or more server systems 10 and one or more client or end-user systems 14. Server systems 10 and client systems 14 may be remote from each other and communicate over a network 12.

Network 12 may be implemented by any number of any suitable communications media (e.g., wide area network (WAN), local area network (LAN), Internet, Intranet, etc.). Alternatively, server systems 10 and client systems 14 may be local to each other, and communicate via any appropriate local communication medium (e.g., local area network (LAN), hardwire, wireless link, Intranet, etc.).

A server system may include an XML module 16 and a schema repository 18 for storing schemas. XML module 16 decomposes a set of XML schema files (e.g., a zip file containing XML schemas defining an industry standard, proprietary standard, ad hoc schema, arbitrary collection of schema documents, etc.) into subsets corresponding to top-level schema files. In addition, the XML module creates a separate library in the repository for each subset. The XML module and/or the schema repository may be distributed across plural server systems. Alternatively, the XML module and/or schema repository may reside on a client system 14 or other computer system in communication with the client system.

Client systems 14 enable users to load XML schema files (e.g., as a zip file) into XML module 16. The client systems may present any graphical user (e.g., GUI, etc.) (FIGS. 5A-5B) or other interface (e.g., command line prompts, menu screens, etc.) to receive commands from users; interact with XML module 16, repository 18, and other modules or services; and display results (e.g., browse schemas, view type and element information, create jobs to compose or parse XML documents based on a schema, view features of an XML document conforming to a schema, etc.).

Server systems 10 and client systems 14 may be implemented by any conventional or other computer systems preferably equipped with a display or monitor, a base (e.g., including at least one processor 30, memories 40 and/or internal or external network interface or communications devices 35 (e.g., modem, network cards, etc.)), optional input devices (e.g., a keyboard, mouse, or other input device), and any commercially available and custom software (e.g., server/communications software, XML module software, etc.). The computer systems may include server, desktop, laptop, and hand-held devices. In addition, the XML module 16 may include one or more modules or units to perform the various functions of present invention embodiments described below (e.g., uncompressing zip files, creating zip files, parsing XML schema files, determining hierarchies of schema files (e.g., finding top-level schema files, finding files included directly or indirectly by a schema file, etc.), validating schemas, browsing schemas, creating schema libraries, etc.), may be implemented by any combination of any quantity of software and/or hardware modules or units, and may reside within memory 40 of the server and/or client systems for execution by processor 30. Repository 18 may be implemented by any conventional or other data storage system.

A data flow diagram illustrating a manner of decomposing a large number of XML schema documents (e.g., via server system 10 and/or client system 14) according to an embodiment of the present invention is illustrated in FIG. 2. In particular, a zip file 210 contains a set of XML schema files 220. Some of the schema files 220 may import or include others, thereby forming one or more directed graphs of files, where each graph corresponds to a distinct schema. Files belonging to separate graphs may conflict with one another (e.g., two files may use the same qualified name for an element of a different type). The zip file is loaded into XML module 16 (e.g., via client system 14 or server system 10). The XML module decomposes the schema files into subsets 230 corresponding to separate graphs. A non-root schema file 220 may belong to more than one file graph (e.g., if it is included by more than one root schema file), in which case subsets contain separate instances of the common schema file. The XML module creates (e.g., in schema repository 18) one schema library 240 (sometimes referred to as a contract library) for each subset. The XML module and schema library may use any languages, formats, and media to represent or store a schema.

Example contents of a zip file 210 are listed in FIG. 3A. The top directory level of the example zip file contains two schema files: ItemA.xsd and ItemB.xsd. In addition, the example zip file contains two subdirectories: Simple and Complex. Each subdirectory contains a schema file named identity.xsd. Example contents of the schema files are shown in FIG. 3B. ItemA.xsd includes the identity file from subdirectory Simple, while ItemB.xsd includes the identity file from subdirectory Complex. Each of the two files named identity.xsd defines an element named "identity." However, the type of the "identity" element is different in the two files. Specifically, the Simple/identity.xsd file specifies that the identity element contains one element named "name," while the Complex/identity.xsd file specifies that the "identity" element contains three elements, named "firstName," "middleInitial," and "lastName". Thus, importing the two identity files together would result in a type conflict or inconsistency. The XML module separates the files into two sets {ItemA.xsd and Simple/identity.xsd} and {ItemB.xsd and Complex.xsd}, each of which defines a valid schema without a type conflict.

Figure 4:
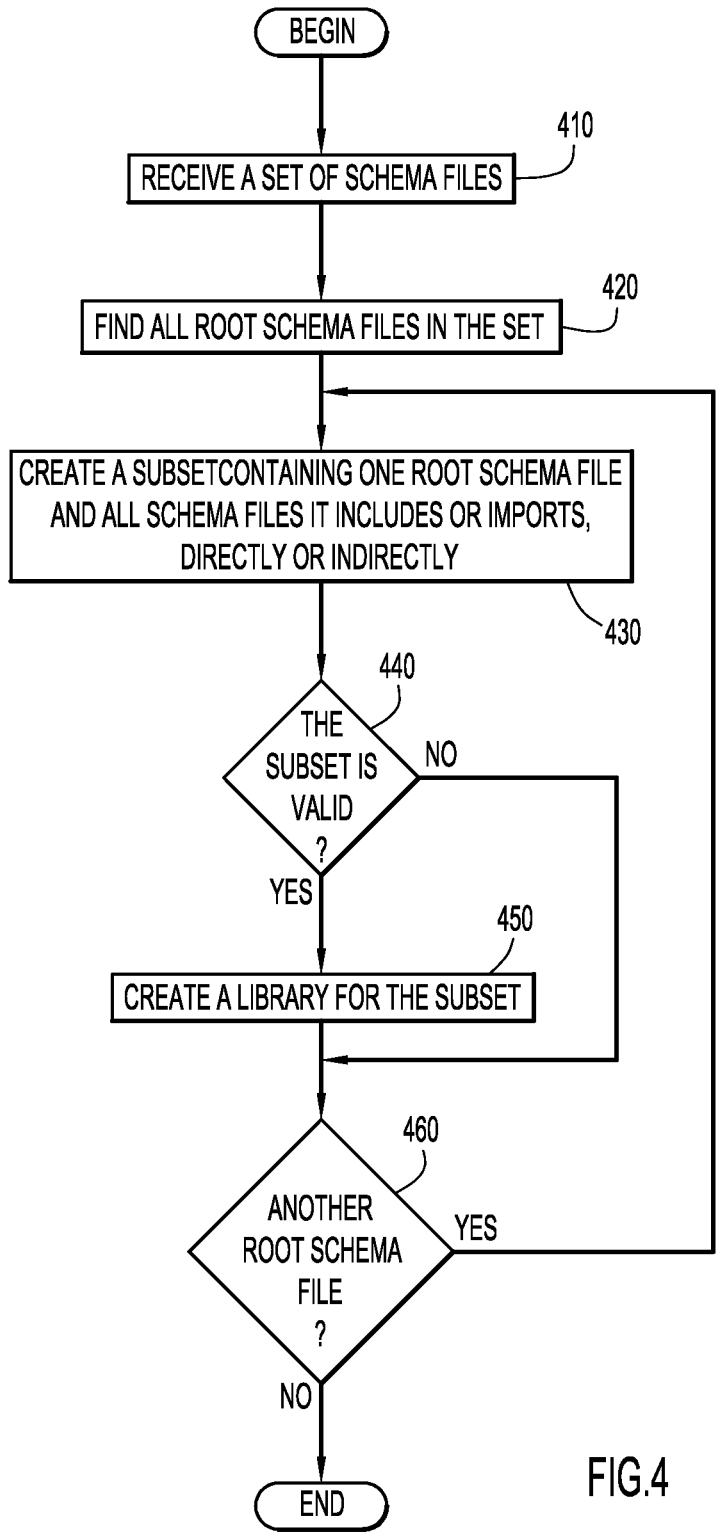
FIG. 4 is a procedural flow chart illustrating an example manner in which a set of XML schema files are decomposed into subsets according to an embodiment of the present invention.

A manner in which a set of XML schema files is decomposed into subsets (e.g., via server system 10 and/or client system 14) according to an embodiment of the present invention is illustrated in FIG. 4. Initially, the XML module receives a set of XML files (e.g., a set of XML files packaged in a zip file) at step 410. The XML module unzips or otherwise unpacks the set as necessary. At step 420, the top-level schema files in the set are identified. The XML module automatically determines the top-level schema files (e.g., by making a list of all the schema files in the set, searching each file for include and import statements, and dropping from the list each file included or imported by another). For each top-level schema file, a subset of files is created at step 430. The subset contains the top-level schema file and all of the files included or imported by the top-level file directly or indirectly. At step 440, the XML module determines whether the files of the subset combined constitute a valid description of a schema. For example, the subset can be tested for internal consistency of element names and types. If the schema files are written in XSD or another schema description language that is itself an XML language, the combined description can be tested for conformity with the rules of the schema description language. Alternatively, the validation at step 440 may be partial (e.g., checks only for specific inconsistencies) or omitted. If the subset does constitute a valid schema, a separate schema library is created for that subset in the repository at step 450. At step 460, the XML module determines whether any top-level files remain to be processed. If so, processing returns to step 430 where a new subset is created for the next top-level file. Otherwise, the process ends.

As a result, each schema library contains the schema files of a single subset (i.e., a single hierarchy of schema files, together defining a valid schema). Each library provides access to the type information for any global type within the library. Since each library corresponds to a single, valid, top-level schema file, a library does not contain duplicate global types of the same name, a situation that is common within the zip files provided for industry standards. Furthermore, the type information may be displayed (e.g., in a GUI via client system 14) for a user in a type viewer. The type viewer can be used to display the entire type regardless of its original source file and language (e.g., xsd, wsdl, etc.).

Figure 5A:
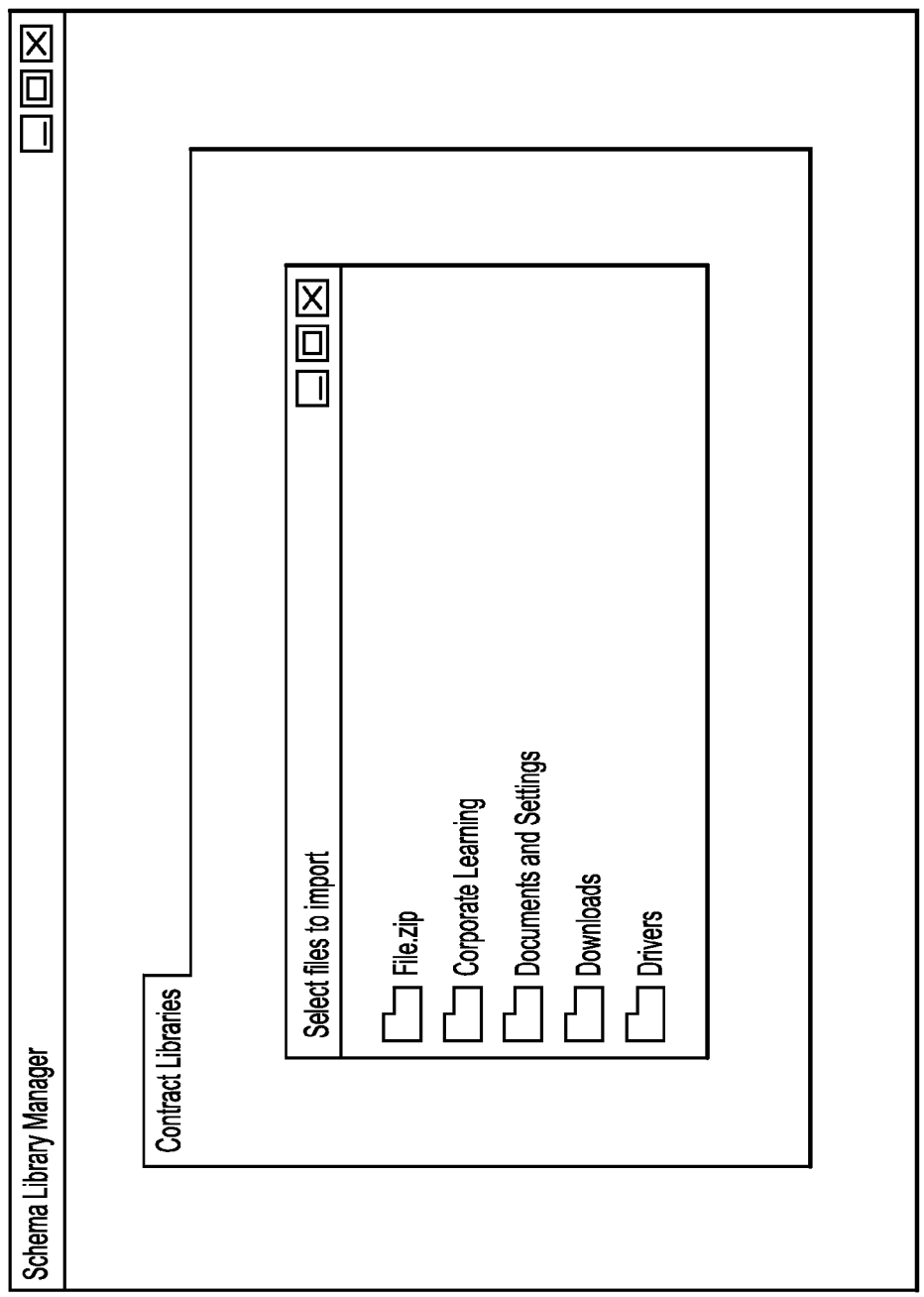
FIG. 5A is a schematic illustration of an example graphical user interface (GUI) for importing a set of schema documents as a zip file according to an embodiment of the present invention.
Figure 5B:
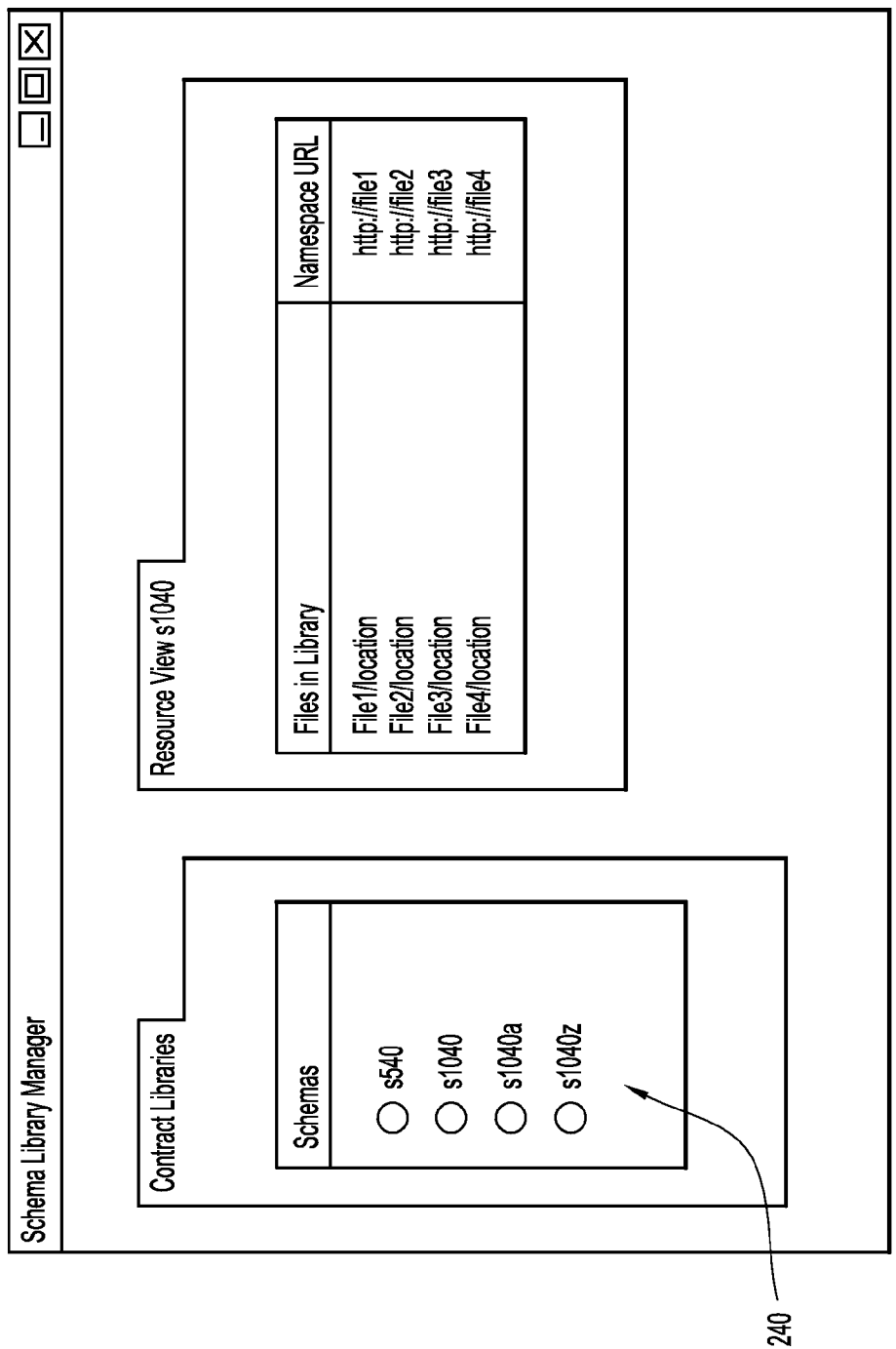
FIG. 5B is a schematic illustration of an example GUI for browsing schema libraries created from a set of schema documents according to an embodiment of the present invention.

FIGS. 5A and 5B illustrate an example manner in which a user imports a set of XML schema documents as a zip file and browses the resulting libraries (e.g., via client system 14 and/or server 10) according to an embodiment of the present invention. In particular, FIG. 5A illustrates a GUI for a Schema Library Manager (in the background) and a GUI dialog box (in the foreground). The Schema Library Manager GUI enables a user to browse contract libraries and view and import resources (e.g., zip files containing industry standards schemas, individual schemas, etc.). The Schema Library Manager presents the dialog box to enable a user to browse a file system and select a file or files (e.g. a zip file) to be imported into one or more contract libraries (e.g., via XML module 16). FIG. 5B illustrates an example in which four schema libraries 240 have been generated from an imported zip file, and the user has selected one of these, the s1040 library. As a result, the Schema Library Manager lists all of the schema files in the s1040 library and their namespace Uniform Resource Identifiers (URIs).

In addition, a GUI may allow a user to inspect a global type within a given library. The GUI may show all of the elements and attributes within the type. Elements and attributes can be inspected to show detailed information such as their type, namespace URI of their qualified name, whether they are optional, etc.

Furthermore, after the schema files are imported, given a sample data file, the system can highlight aspects of the file (e.g., the top element, the contract library it belongs to, etc.) that describes the data. This helps the user to better understand the schema.

An embodiment of the present invention can also be used to generate a set of zip files for any set of XML schema files (e.g., XML schemas defining an industry standard, proprietary standard, ad hoc schema, arbitrary collection of schema documents, etc.). For each top-level schema file of the set, the embodiment creates a zip file containing the top-level schema file plus all the schema files related to the top-level schema file.

It will be appreciated that the embodiments described above and illustrated in the drawings represent only a few of the many ways of implementing embodiments for decomposing a large number of XML schema documents into multiple subsets.

The topology or environment of the present invention embodiments may include any number of computer or other processing systems (e.g., client or end-user systems, server systems, etc.) and web sites, databases, libraries or other repositories arranged in any desired fashion, where the present invention embodiments may be applied to any desired type of computing environment (e.g., cloud computing, client-server, network computing, mainframe, stand-alone systems, etc.). The computer or other processing systems employed by the present invention embodiments may be implemented by any number of any personal or other type of computer or processing system (e.g., IBM-compatible, laptop, PDA, mobile devices, etc.), and may include any commercially available operating system and any commercially available or custom software (e.g., XML module software, repository management software, communications software, server software, etc.). These systems may include any types of monitors and input devices (e.g., keyboard, mouse, voice recognition, touch screen, etc.) to enter and/or view information.

It is to be understood that the software (e.g., XML module, client software, server software, information processing software, etc.) of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The computer systems of the present invention embodiments may alternatively be implemented by any type of hardware and/or other processing circuitry.

The various functions of the computer or other processing systems may be distributed in any manner among any number of software and/or hardware modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, etc.). For example, the functions of the present invention embodiments may be distributed in any manner among the various end-user/client and server systems, and/or any other intermediary processing devices including third party client/server processing devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., XML module, repository management software, etc.) may be available on a computer useable or recordable medium (e.g., magnetic or optical mediums, magneto-optic mediums, floppy diskettes, CD-ROM, DVD, memory devices, etc.) for use on stand-alone systems or systems connected by a network or other communications medium.

The communication network may be implemented by any number of any types of communications network (e.g., LAN, WAN, Internet, Intranet, VPN, etc.). The computer or other processing systems of the present invention embodiments may include any conventional or other communications devices to communicate over the network via any conventional or other protocols. The computer or other processing systems may utilize any type of connection (e.g., wired, wireless, etc.) for access to the network. Local communication media may be implemented by any suitable communication media (e.g., local area network (LAN), hardwire, wireless link, Intranet, etc.).

The system may employ any number of any conventional or other libraries, databases, data stores or storage structures (e.g., files, databases, data structures, data or other repositories, etc.) to store information (e.g., industry standards, schemas, business content, metadata, etc.). The database system may be implemented by any number of any conventional or other databases, data stores or storage structures (e.g., files, databases, data structures, data or other repositories, etc.) to store information (e.g., industry standards, schemas, business content, metadata, etc.). The XML module and/or schema repository may be included within or coupled to the server and/or client systems.

Present invention embodiments may be used to decompose any quantity of sets of schema files of any type (e.g., XSD files, WSDL files, DTD files, SGML schema files, etc.) representing any type of schemas (e.g., industry standards, proprietary standards, ad hoc schemas, arbitrary collections of schema documents, etc.). The XML module may receive and/or create any quantity of sets of XML schema files in any format (e.g., zip files, tar files, tgz files, individual files, etc.).

The present invention embodiments may employ any number of any type of user interface (e.g., Graphical User Interface (GUI), command-line, prompt, etc.) for obtaining or providing information (e.g., uploading the desired schema files, browsing schemas, etc.), where the interface may include any information arranged in any fashion. The interface may include any number of any types of input or actuation mechanisms (e.g., buttons, icons, fields, boxes, links, etc.) disposed at any locations to enter/display information and initiate desired actions via any suitable input devices (e.g., mouse, keyboard, etc.). The interface screens may include any suitable actuators (e.g., links, tabs, etc.) to navigate between the screens in any fashion.

The present invention embodiments are not limited to the specific tasks, algorithms, or network/environment described above, but may be utilized for decomposing any set of XML schema files.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes", "including", "has", "have", "having", "with" and the like, when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or " or system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The various modules (e.g., XML module, repository manager, etc.) may be implemented by any combination of any quantity of software and/or hardware modules or units, and may reside within memory 40 of the server and client systems for execution by processor 30.

What is claimed is:

1. A system for decomposing a set of schema files comprising:
    at least one processor configured to:
        automatically identify a plurality of root schema files in the set of schema files by making a list of all schema files in the set of schema files, and removing from the list each schema file included or imported by another schema file of the set of schema files, wherein each root schema file is limited to information for that root schema file; and
        create a subset for each identified root schema file, wherein
            each created subset contains the corresponding identified root schema file and
            at least one particular subset further includes one or more non-root schema files that indirectly provide information for a particular root schema file of the at least one particular subset.

2. The system of claim 1, wherein the at least one processor is further configured to:
    validate, for each subset, the root schema defined by the subset.

3. The system of claim 1, wherein the at least one processor is further configured to:
    create, for each subset, a library and store the root schema defined by the subset in the library.

4. The system of claim 3, wherein the at least one processor is further configured to:
    display a user interface providing information pertaining to a type within at least one of the libraries, wherein the information provided by the user interface includes elements and attributes of the type.

5. The system of claim 3, wherein the at least one processor is further configured to:
    display the set of schema files and visually distinguish the root schema files and their corresponding libraries.

6. The system of claim 1, wherein the set of schema files is defined by an industry standard.

7. The system of claim 1, wherein the at least one processor is further configured to:
    create for each subset a file containing every schema file of the subset.

8. A computer program product comprising:
    a non-transitory computer readable storage medium having computer readable program code embodied therewith for execution on a first processing system, the computer readable program code configured to:
        automatically identify a plurality of root schema files in the set of schema files by making a list of all schema files in the set of schema files, and removing from the list each schema file included or imported by another schema file of the set of schema files, wherein each root schema file is limited to information for that root schema file; and
        create a subset for each identified root schema file, wherein
            each created subset contains the corresponding identified root schema file and
    at least one particular subset further includes one or more non-root schema files that indirectly provide information for a particular root schema file of the at least one particular subset.

9. The computer program product of claim 8, wherein the computer readable program code further configured to:
    validate, for each subset, the root schema defined by the subset.

10. The computer program product of claim 8, wherein the computer readable program code further configured to:
    create, for each subset, a library and store the root schema defined by the subset in the library.

11. The computer program product of claim 10, wherein the computer readable program code further configured to:
    display a user interface providing information pertaining to a type within at least one of the libraries, wherein the information provided by the user interface includes elements and attributes of the type.

12. The computer program product of claim 10, wherein the computer readable program code further configured to:
    display the set of schema files and visually distinguish the identified plurality of root schema files and their corresponding libraries.

13. The computer program product of claim 8, wherein the set of schema files is defined by an industry standard.

14. The computer program product of claim 8, wherein the computer readable program code further configured to:
    create for each subset a file containing every schema file of the subset.

* * * * *